United States Patent
Iwasaki et al.

[11] Patent Number: 5,917,789
[45] Date of Patent: Jun. 29, 1999

[54] METHOD AND DEVICE FOR DETECTING AN AMOUNT OF ACTUATOR OFFSET FOR AN OPTICAL DISK DEVICE

[75] Inventors: Masaaki Iwasaki; Toru Ikeda, both of Kawasaki, Japan

[73] Assignee: Fujitsu Limited, Kawasaki, Japan

[21] Appl. No.: 08/907,941

[22] Filed: Aug. 12, 1997

Related U.S. Application Data

[63] Continuation of application No. 08/513,433, Aug. 10, 1995, abandoned.

[30] Foreign Application Priority Data

Sep. 30, 1994 [JP] Japan .................................... 6-236572

[51] Int. Cl.$^6$ .................................................. G11B 7/085
[52] U.S. Cl. .................................... 369/44.28; 369/44.32; 369/44.35
[58] Field of Search .............................. 369/44.35, 44.36, 369/44.28, 44.29, 44.34, 32, 44.32, 54; 360/77.01–77.04, 77.13, 78.05, 78.06, 78.07, 78.08, 78.11

[56] References Cited

U.S. PATENT DOCUMENTS

| | | | |
|---|---|---|---|
| 5,187,620 | 2/1993 | Notake et al. | 360/77.04 |
| 5,189,653 | 2/1993 | Yanagi | 369/44.32 |
| 5,197,058 | 3/1993 | Bell, Jr. et al. | 369/44.28 |
| 5,235,577 | 8/1993 | Ogino | 369/32 |
| 5,251,194 | 10/1993 | Yoshimoto et al. | 369/44.34 X |
| 5,301,174 | 4/1994 | Matoba et al. | 360/78.06 |
| 5,333,083 | 7/1994 | Nakano | 360/78.07 |
| 5,481,517 | 1/1996 | Yoshimoto et al. | 369/44.28 |

FOREIGN PATENT DOCUMENTS

| | | |
|---|---|---|
| 3507976 | 11/1985 | Germany . |
| 61-182640 | 8/1986 | Japan . |
| 62-192080 | 8/1987 | Japan . |
| 1-300431 | 12/1989 | Japan . |
| 3-78120 | 4/1991 | Japan . |
| 4-44643 | 2/1992 | Japan . |
| 4-252434 | 9/1992 | Japan . |
| 5-314523 | 11/1993 | Japan . |

*Primary Examiner*—W. R. Young
*Attorney, Agent, or Firm*—Greer, Burns & Crain, Ltd.

[57] ABSTRACT

A method which detects an actuator offset amount for an optical disk device is disclosed. The device reproduces signals by forming a spot of a light beam from an optical system on an optical disk and has an actuator for moving the spot in a radial direction of the optical disk. The method includes the steps of controlling a driving signal supplied to the actuator so as to keep the spot at a predetermined position on a moving path of the spot, detecting the driving signal which keeps the spot at the predetermined position, and storing the driving signal as the actuator offset amount. A device for carrying out the method is also disclosed.

23 Claims, 12 Drawing Sheets

METHOD AND DEVICE FOR DETECTING AN AMOUNT OF ACTUATOR OFFSET FOR AN OPTICAL DISK DEVICE

This application is a continuation of application Ser. No. 08,513,433 filed on Aug. 10, 1995, now abandoned.

BACKGROUND OF THE INVENTION

1. Field of the Invention

The present invention generally relates to methods and devices for detecting an amount of actuator offset in an optical disk device, and more particularly relates to a method and a device for detecting an amount of offset of an actuator which is used for moving a light beam spot to a predetermined position on an optical disk in order to record or reproduce signals for the optical disk.

2. Description of the Related Art

Generally, optical disk devices are equipped with an actuator for moving a light beam spot to a predetermined position on an optical disk in order to record or reproduce signals for the optical disk. The actuator includes a lens actuator (fine actuator), which performs a fine adjustment of a position of the beam spot by means of optical lens. Also, the actuator includes a voice coil motor (VCM, or coarse actuator), which performs a rough adjustment of the position of the beam spot by moving a carriage supporting the lens actuator in a radial direction of the optical disk. Both actuators are movable in the radial direction of the optical disk.

Each of the actuators is powered by an electric current from a driving circuit through wiring cords mounted on a flexible printed circuit sheet (FPC) or the like. The flexible printed circuit sheet with its flexibility urges the actuators to one side in its direction of movement. In other words, the actuators are subjected to an offset force in the moving direction. Also, depending on the positioning of the disk device, the actuators are subjected to a positive or negative offset force owing to gravity.

Accordingly, when the electric current is applied to accelerate or decelerate the actuator, the acceleration or deceleration of the actuator will be different from a desired magnitude due to the offset force. Especially, a seek operation for moving the beam spot to a predetermined track on the optical disk through acceleration or deceleration of the VCM will be affected by the offset force. Since the moving path of the carriage is relatively longer than the moving path of the lens actuator, a moving speed of the carriage is determined according to the length of the moving path. However, the actual moving speed of the carriage will be different from the determined one depending on tension of the FPC and the positioning of the disk drive, so that a stable seek operation will not be obtained.

In order to counter this problem, the offset amount can be estimated in advance such that the electric current applied to the actuator can be adjusted based on the magnitude of the offset force. However, the magnitude of the offset force is slightly different from disk device to disk device. Also, it will be affected by the positioning of the disk device. Thus, the estimate of the offset force is not accurate. Thus, it is desirable that the magnitude of the offset force be measured from the time when the optical disk is inserted into the optical disk device to the time when the optical disk device is ready for operation.

A method of measuring the magnitude of the offset force can be as follows. First, electric current is applied to press the actuator against a stopper provided at one end of its moving path. Next, the amount of the electric current is gradually changed while an output of a position sensor for detecting the position of the actuator is monitored. Then, the amount of the electric current applied to the actuator when the actuator just starts moving is measured. Finally, the magnitude of the offset force can be determined based on the measured electric current.

However, since the electric current needed for pressing the actuator against the stopper cannot be known in advance, an excess amount of electric current must be applied at first. The problem is that applying the excessive amount of the electric current might result in a crash of the actuator depending on its positioning, thus causing damage to the actuator.

Also, the estimation of the offset amount described above requires moving the actuator to the end of its moving path and gradually changing the amount of the electric current until the actuator starts leaving the end position. Thus, the estimation of the offset force takes a long time, which in turn leads to a long delay before the optical disk device is ready for operation.

Accordingly, there is a need for a method and a device for detecting an actuator offset amount which can accurately measure an offset amount in a short period of time.

SUMMARY OF THE INVENTION

Accordingly, it is a general object of the present invention to provide a method and a device for detecting an actuator offset amount which can satisfy the need described above.

It is another and more specific object of the present invention to provide a method and a device for detecting an actuator offset amount which can measure an accurate offset amount of the actuator in a short period of time.

In order to achieve the above objects according to the present invention, a method of detecting an actuator offset amount for an optical disk device, which reproduces signals by forming a spot of a light beam from an optical system on an optical disk and has an actuator for moving the spot in a radial direction of the optical disk, includes the steps of controlling a driving signal supplied to the actuator so as to keep the spot at a predetermined position on a moving path of the spot, and detecting the driving signal which keeps the spot at the predetermined position, and storing the driving signal as the actuator offset amount.

The above objects can also be achieved by a device for detecting an actuator offset amount for an optical disk device which reproduces signals by forming a spot of a light beam from an optical system on an optical disk, and has an actuator for moving the spot in a radial direction of the optical disk. The device includes a first unit for controlling a driving signal supplied to the actuator so as to keep the spot at a predetermined position on a moving path of the spot, and a second unit for detecting the driving signal which keeps the spot at the predetermined position, and storing the driving signal as the actuator offset amount.

In the method and the device described above, the driving signal is detected while the actuator keeps the spot of the light beam at the predetermined position. The spot of the light beam is sustained at the predetermined position because the detected driving signal being applied to the actuator cancels the offset force applied to the actuator. Thus, the driving signal corresponding to the amount of the actuator offset is measured accurately.

Other objects and further features of the present invention will be apparent from the following detailed description when read in conjunction with the accompanying drawings.

DESCRIPTION OF THE PREFERRED EMBODIMENTS

In the following, embodiments of the present invention will be described along with accompanying drawings.

In the following, a first embodiment of the present invention will be described along with FIG. 1 to FIG. 2.

Figure 1:
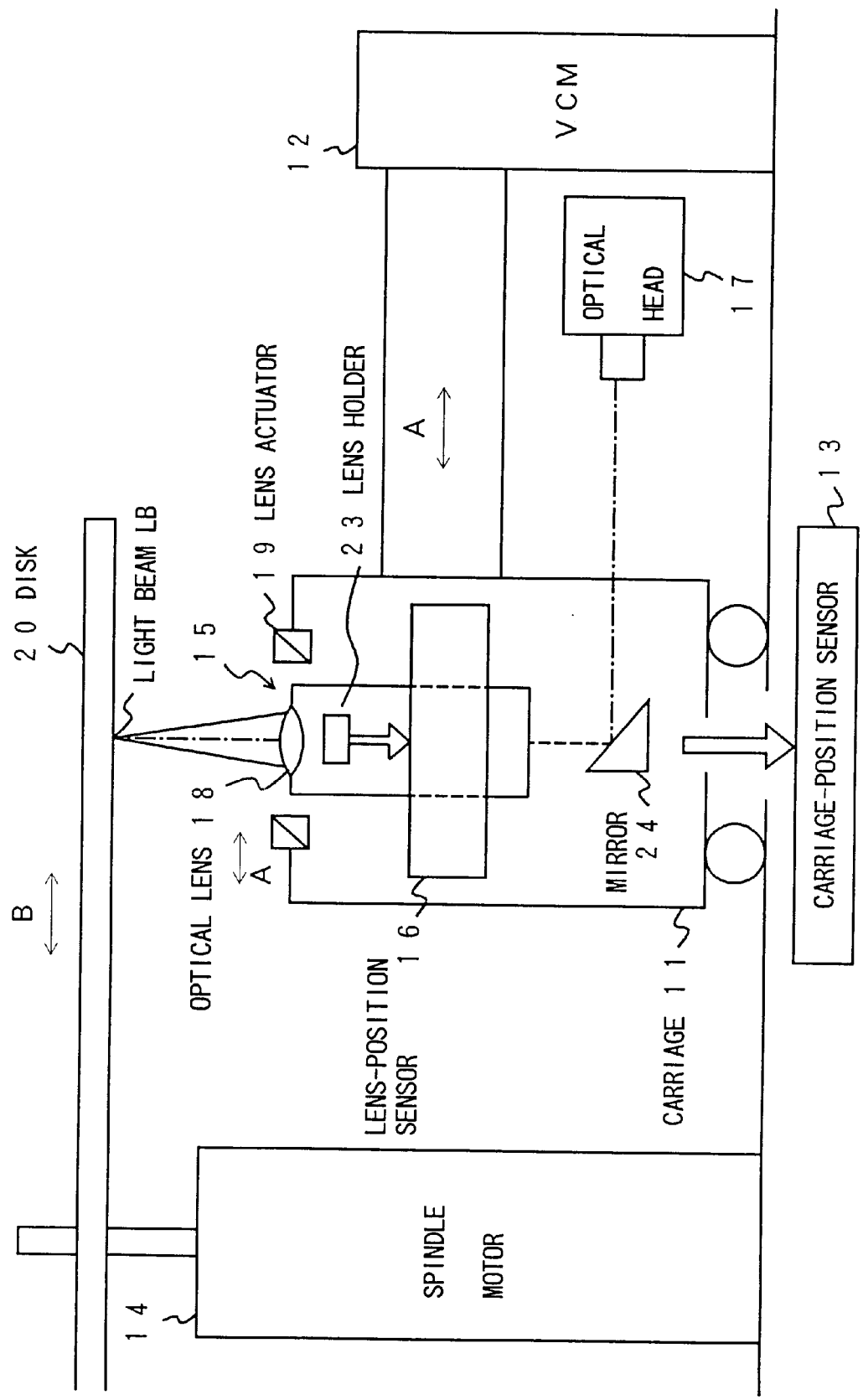
FIG. 1 is a cross-sectional schematic view of an optical disk device according to the present invention.

FIG. 1 shows a cross-sectional schematic view of an optical disk device to which the present invention is applied. FIG. 2 is an isometric view showing part of the optical disk device.

In FIG. 1, the optical disk device includes a carriage 11, a voice coil motor (VCM, or a coarse actuator) 12 for moving the carriage 11 in a moving direction A, a carriage-position sensor 13 for detecting the position of the carriage 11, and a spindle motor 14 for rotating an optical disk 20. The moving direction A coincides with a radial direction B of the optical disk 20, so that the VCM 12 performs a coarse adjustment of a position of a light beam spot LB by moving the carriage 11 in the radial direction B of the optical disk 20. Here, the radial direction B is the direction of a seek operation, i.e., a direction transverse to the tracks on the optical disk 20.

The carriage 11 is provided with an optical system 15 for illuminating the light beam LB on the optical disk 20 in order to record or reproduce signals for the optical disk 20. The carriage 11 is also provided with a lens-position sensor 16. The optical system 15 includes a standing mirror 24, an optical lens 18, and a lens actuator (fine actuator) 19. The standing mirror 24 supplies the light beam LB from an optical head 17 to the optical system 15 and vice versa. The optical lens 18 is held by a lens holder 23, and focuses the beam spot on the optical disk 20. The lens actuator 19 performs a fine adjustment of the position of the beam spot by moving the optical lens 18. The lens-position sensor 16 detects the position of the optical lens 18.

Figure 2:
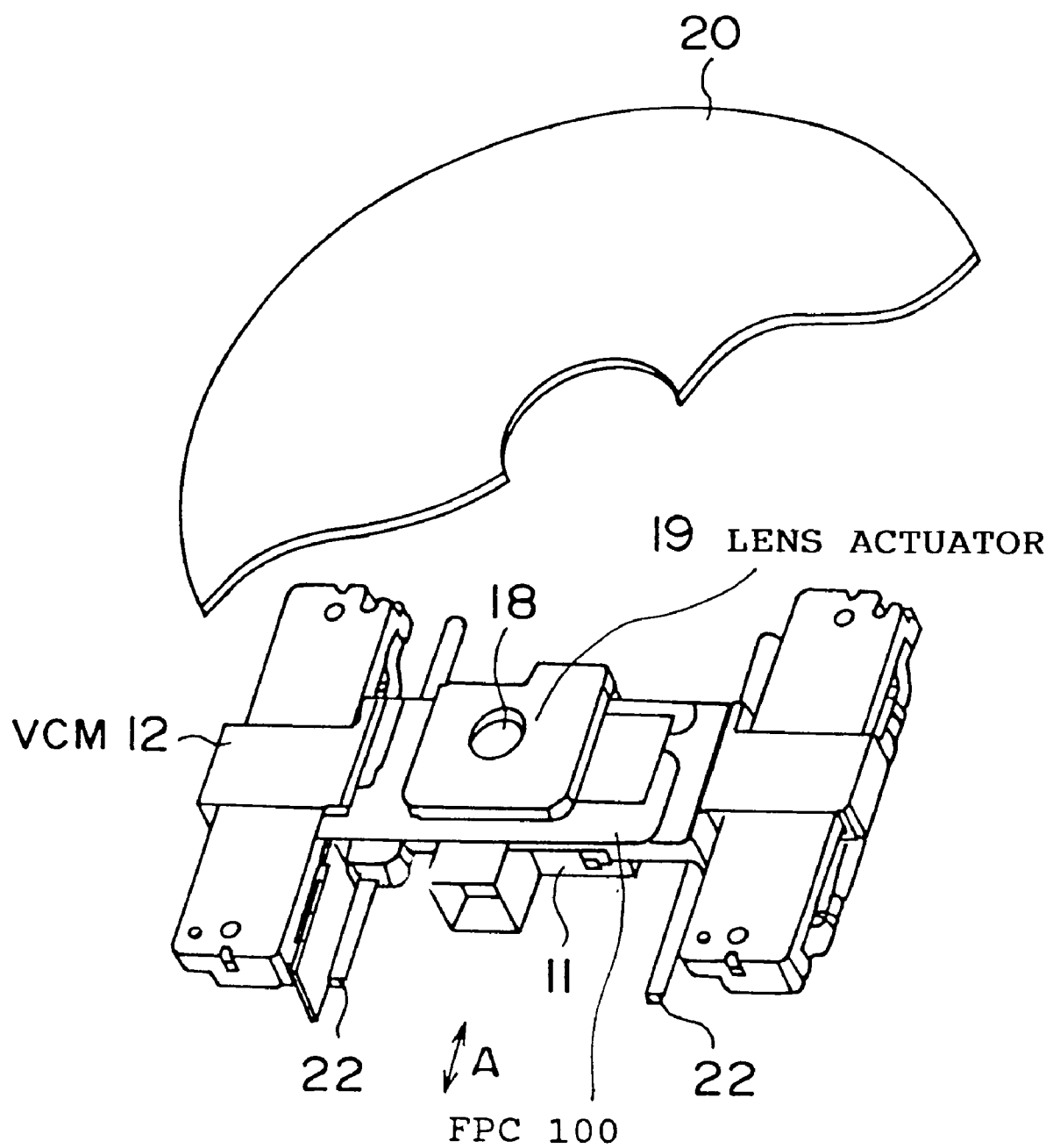
FIG. 2 is an isometric view showing part of the optical disk device of FIG. 1.

As shown in FIG. 2, the carriage 11 is guided by a pair of guide members 22 so as to move along the moving direction A. Also, in FIG. 2 is shown a FPC 100, which is a cause of the offset force described earlier. The FPC 100 supplies a signal from the lens-position sensor 16 to a circuit on a printed board, which signal is then used for the fine adjustment of the beam-spot position. Also, the FPC 100 serves as a conduit for conveying signals for the focusing and tracking driving of the beam spot.

Figure 3:
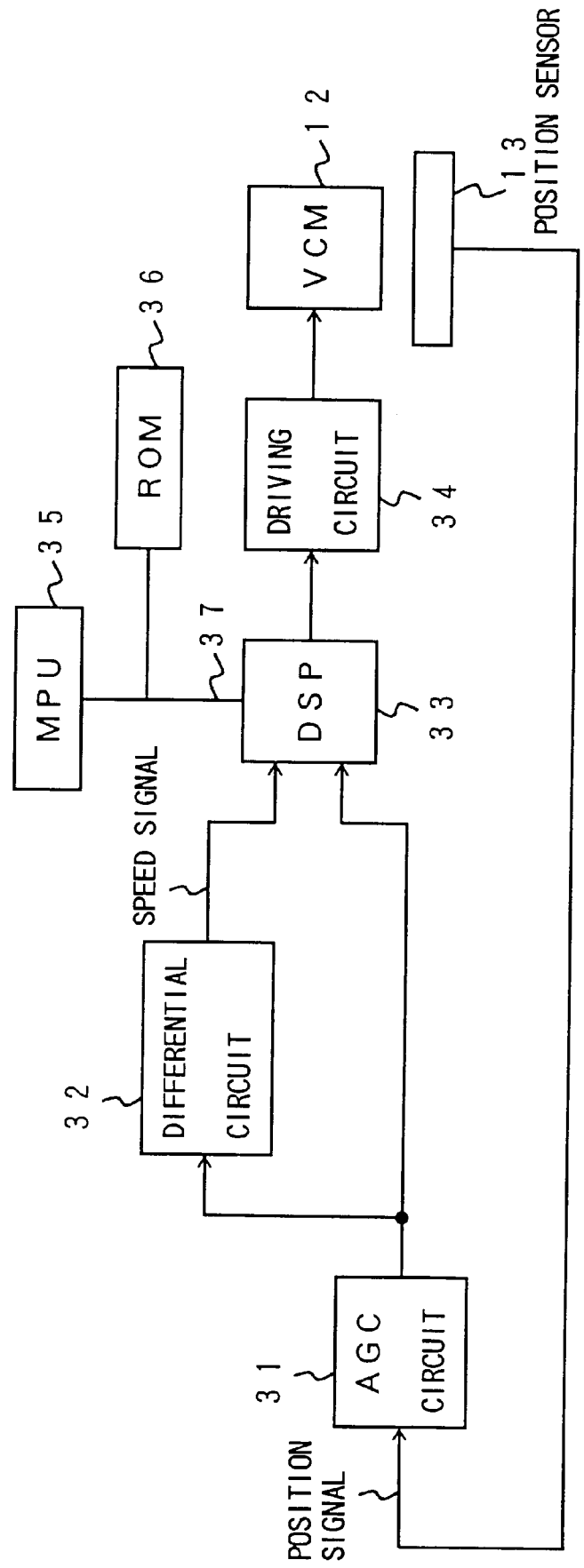
FIG. 3 is a block diagram of an example of a servo-system configuration for a VCM of FIG. 1 according to a first embodiment.

FIG. 3 shows a block diagram of an example of a servo-system configuration for the VCM 12 according to the first embodiment. In the figure, a position-detection signal from the carriage-position sensor 13 is supplied to an auto-gain-control (AGC) circuit 31. A position signal from the AGC circuit 31 is provided to a differential circuit 32 and a digital signal processor (DSP) 33. The differential circuit 32 provides the DSP 33 with a speed signal derived by taking a differential of the position signal. Based on the position signal and the speed signal, the DSP 33 generates a signal for driving the VCM 12 at a predetermined speed for a desired duration, and supplies the signal to the driving circuit 34. The driving circuit 34, based on the signal from the DSP 33, supplies to the VCM 12 the electric current for driving the VCM 12. Also, the DSP 33 is connected to a micro-processor unit (MPU) 35 and a read-only memory (ROM) 36 via a bus 37. The MPU 35 is a controller on a host side which governs the control of the entire disk device. The ROM 36 stores programs to be executed by the MPU 35 and data to be used by the DSP 33.

Figure 4:
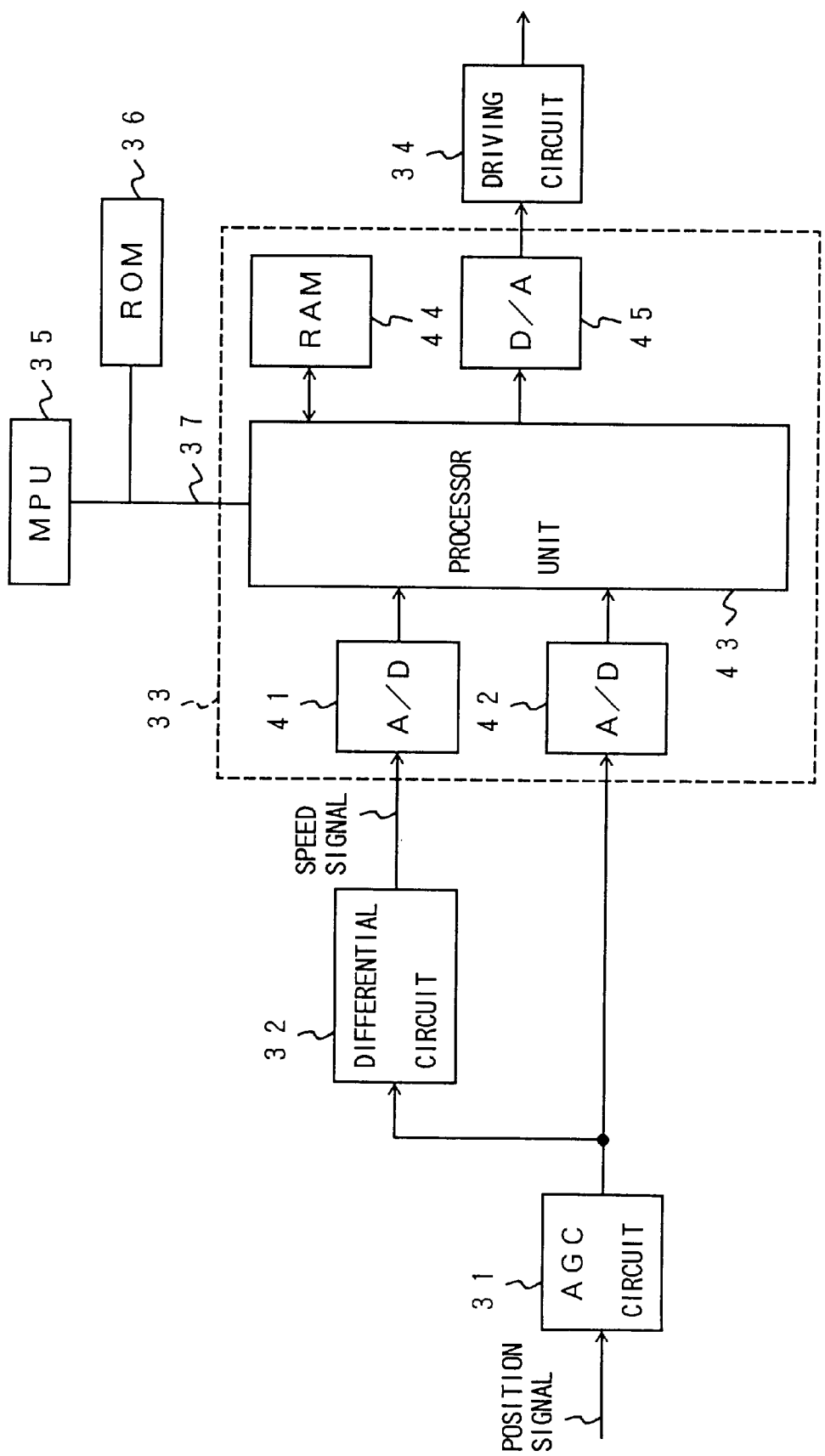
FIG. 4 is a block diagram of part of FIG. 3 showing details of a DSP of FIG. 3.

FIG. 4 shows a block diagram of part of FIG. 3. In FIG. 4, the DSP 33 includes analog/digital (A/D) converters 41 and 42, a processor unit 43, a random access memory (RAM) 44, and a digital/analog (D/A) converter 45. The A/D converter 41 is provided with the speed signal from the differential circuit 32. The A/D converter 42 is provided with the position signal from the AGC circuit 31. The processor unit 43, based on outputs of the A/D converters 41 and 42, a driving bias, a speed offset, and a position offset, which will be describe later, calculates the signal for driving the VCM 12 at a predetermined speed for a desired duration. Then, this signal is supplied to the D/A converter 45. The D/A converter 45 converts this signal into an analog signal, and supplies this analog signal to the driving circuit 34. The RAM 44 temporarily stores results of various intermediate calculations performed by the processor 43.

Figure 5:
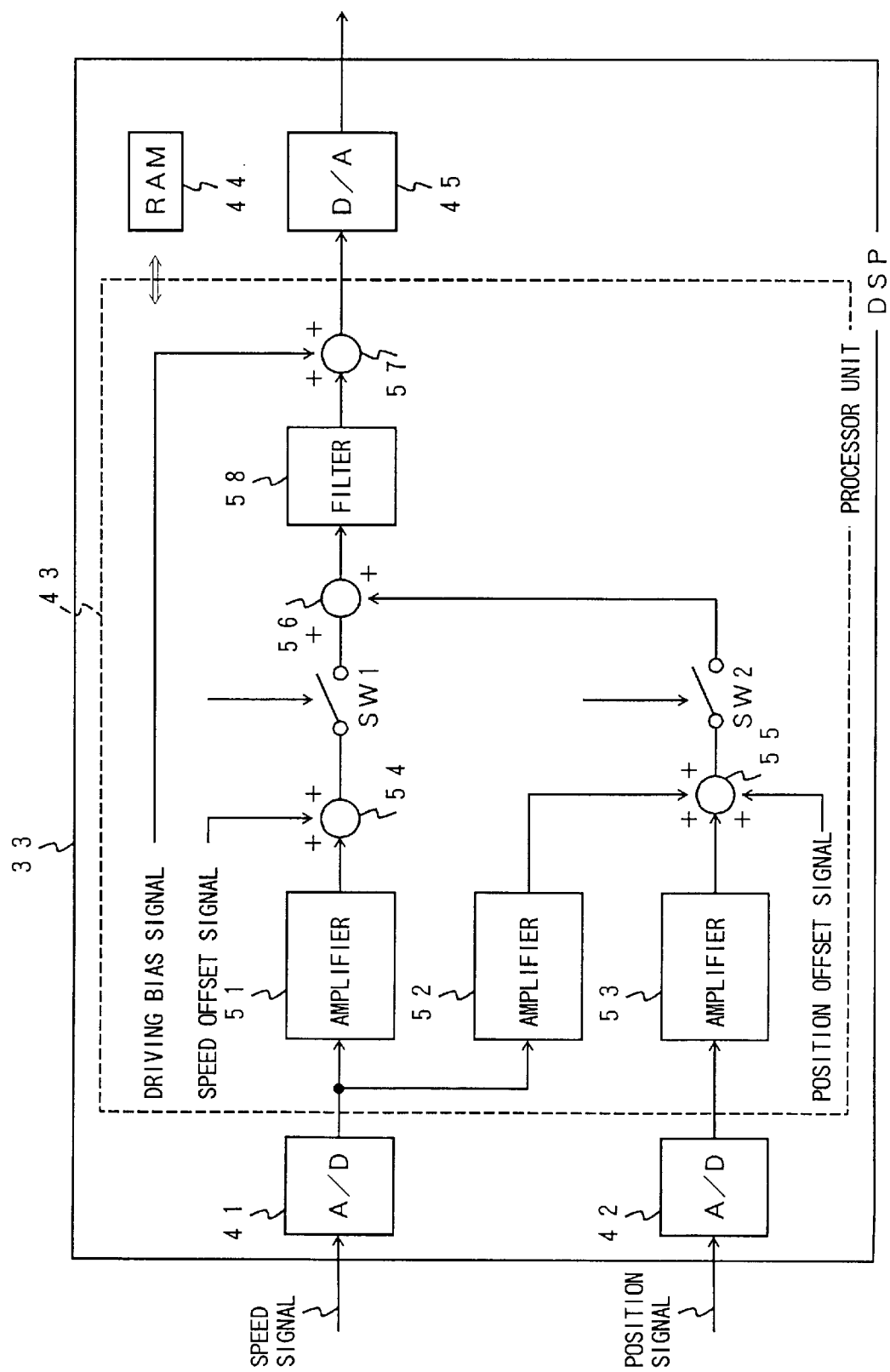
FIG. 5 is a block diagram whose operation is equivalent to an operation of a processor unit of FIG. 3 according to the first embodiment.

FIG. 5 is a block diagram whose operation is equivalent to an operation of the processor unit 43 according to the first embodiment. In the figure, the processor unit 43 includes amplifiers 51 to 53 for multiplying coefficients, adders 54 to 57, a filter 58, and switches SW1 and SW2. The amplifiers 51 and 52 receive the signal from the A/D converter 41, and the amplifier 53 receives the signal from the A/D converter 42. An output of the amplifier 51 is added to the speed offset signal at the adder 54 and, then, the sum of these two is supplied to the adder 56 via the switch SW1. Outputs of the amplifiers 52 and 53 are added to the position offset signal at the adder 55 and, then, the sum of these three is supplied to the adder 56 via the switch SW2. An output of the adder 56 is input to the filter 58, whose output is added to the driving bias signal at the adder 57. An output of the adder 57 is supplied to the D/A converter 45.

The driving bias signal and the speed offset signal are obtained by the processor unit 43. The driving bias signal represents an offset amount which should be added to or subtracted from the signal to be supplied to the D/A converter 45 in order to cancel the offset force, which is applied to the VCM 12 (carriage 11) by the wiring connections on the flexible printed circuit sheet and similar circuit devices or by gravity, depending on the positioning of the disk device. The speed offset signal represents an offset amount which should be added to or subtracted from the speed signal in order to adjust the actual speed of the carriage 11 to a desired moving speed by taking into account this offset force.

During the seek operation, the carriage 11 should be moved by the VCM 12 at a higher speed for a longer travel distance than during other operations. In order to move the carriage 11 at an optimal speed from its current position to a desired position, a speed table stored in the ROM 36 is used. This speed table contains optimal speeds for different travel distances of the carriage 11 in a table format, which optimal speeds are calculated in advance. Since the use of such a speed table for controlling the moving speed of the carriage 11 is well known, detailed description thereof will be omitted here. The processor unit 43 of the DSP 33 obtains the optimal speed by accessing the speed table stored in the ROM 36 based on the position signal from the AGC circuit 31. Then, the processor unit 43 obtains the signal to be provided for the driving circuit 34 based on this optimal speed and the speed signal supplied from the differential circuit 32. Here, during the seek operation, the switch SW1 is kept closed and the switch SW2 is kept open. In this condition, the carriage 11 is moved while the moving speed of the carriage 11 is locked to or kept at the optimal speed. Thus, only the driving bias signal and the speed offset signal should be taken into consideration during the seek operation.

Figure 6:
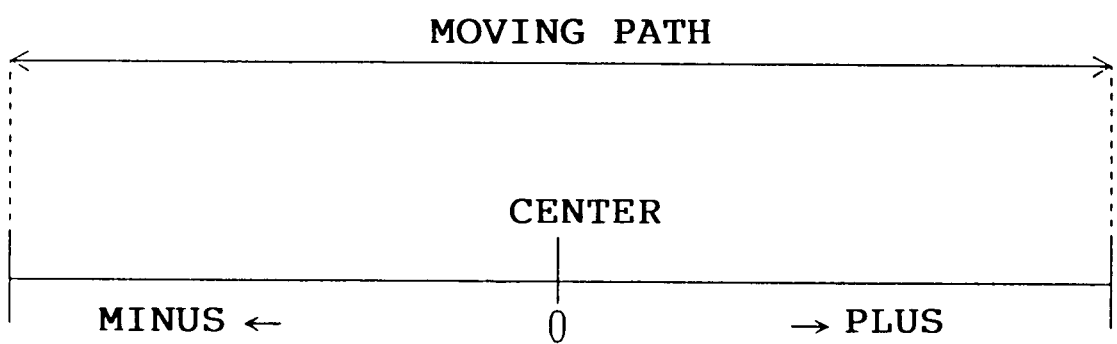
FIG. 6 is an illustrative drawing for explaining a position offset signal of FIG. 5.

The position offset signal is provided by the MPU 35 of FIG. 4. This position offset signal indicates a position to which the carriage 11 should be moved, and is used for moving the beam spot to a desired track on the optical disk 20 in response to a command for the seek operation or the like. As shown in FIG. 6, the position offset signal, which is "0" at the center of the moving path of the carriage 11, increases as an indicated position goes toward the perimeter of the optical disk 20, and decreases as the indicated position goes toward the center of the optical disk 20. Thus, if the position offset signal having an offset value "0" is supplied to the processor unit 43 from the MPU 35, the processor unit 43 provides the D/A converter 45 with a signal for moving the carriage 11 to the center of the moving path.

Figure 7:
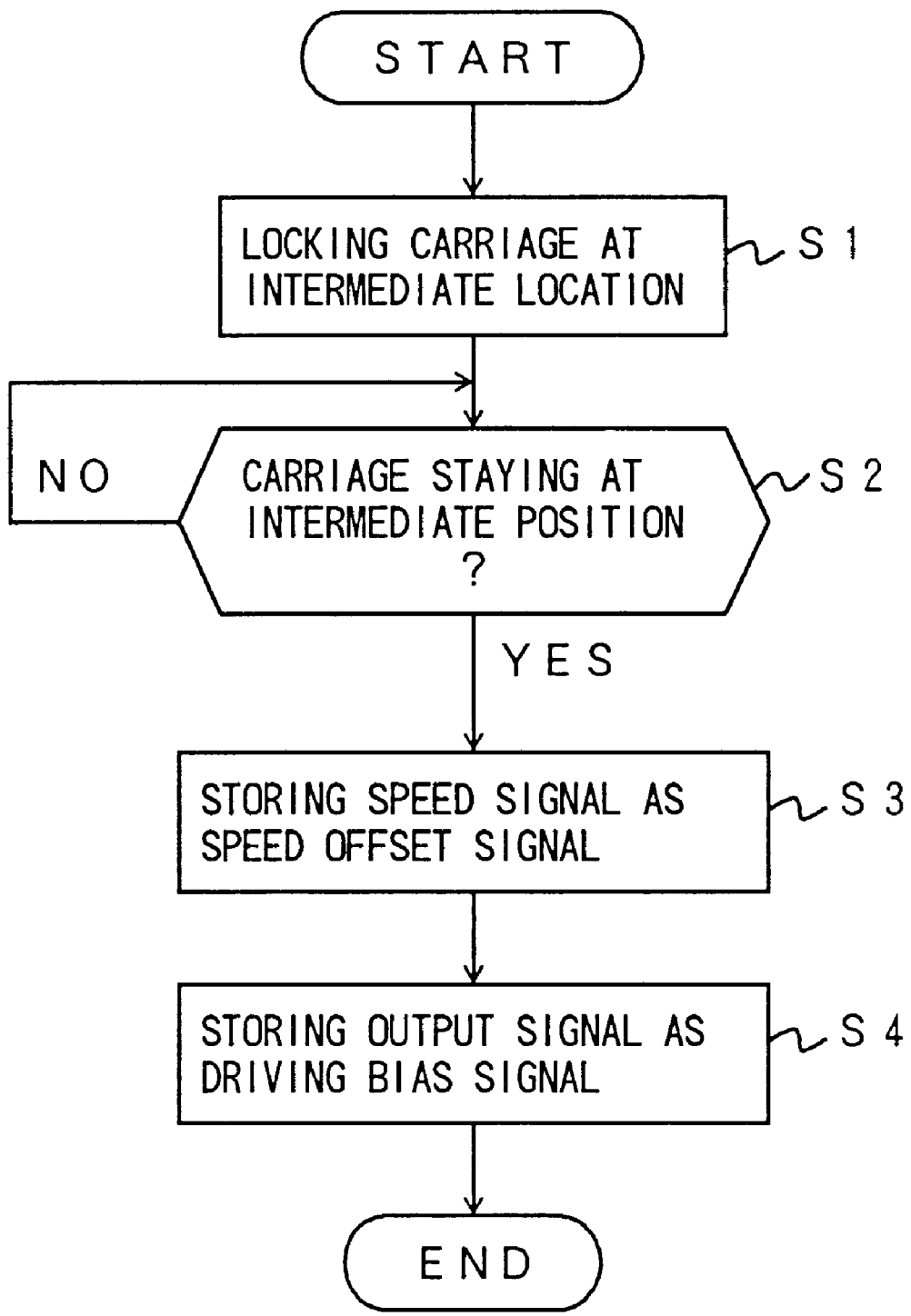
FIG. 7 is a flowchart of a process of the processor unit when it adjusts the offset amount of the VCM.

FIG. 7 shows a flowchart of a process of the processor unit 43 of the DSP 33 when it adjusts the offset amount of the VCM 12. Thus, FIG. 7 shows the first embodiment of the method of detecting the actuator offset amount for the optical disk device according to the present invention.

In FIG. 7, at a step S1, the carriage 11 is controlled (hereinafter called "locked") to be positioned at an intermediate location on its moving path. This intermediate location is a predetermined arbitrary position on the moving path, and, for example, is stored in the ROM 36 of FIG. 4 beforehand. The MPU 35 reads out from the ROM 36 an offset amount corresponding to the intermediate location, and supplies the position offset signal of this offset amount to the adder 55 of the processor unit 43 via the bus 37. That is, the processor unit 43 keeps the switch SW1 open and the switch SW2 closed, and locks the carriage 11 at the intermediate location after moving the carriage 11 to this intermediate location. This is done while the processor unit 43 monitors the position signal provided by the carriage position sensor 13 via the AGC circuit 31.

In the first embodiment, the intermediate position at which the carriage 11 is locked is determined at a general center of the moving path, i.e., an equilibrium point of the optical disk device. However, the intermediate position can be any arbitrary position along the moving path of the carriage 11.

At a step S2, a check is made based on the position signal from the carriage position sensor 13 whether the carriage 11 is staying at the intermediate position. If an answer of the check is "YES", the procedure goes to a step S3.

At the step S3, the speed signal supplied to the A/D converter 41 from the differential circuit 32 is stored in the RAM 44 as the speed offset signal. This is done while the carriage 11 is staying at the intermediate position. At a step S4, the output signal of the adder 57 of the processor unit 43, which is to be supplied to the D/A converter 45, is stored in the RAM 44 as the driving bias signal. This is done while the carriage 11 is still at the intermediate position.

When a seek operation is initiated, the driving bias signal and the speed offset signal are read from the RAM 44, and are supplied to the adder 57 and the adder 54, respectively.

Accordingly, when the offset force is applied to the carriage 11 in an opposite direction to its moving direction, the positive driving bias signal is added to the signal supplied to the D/A converter 45. On the other hand, when the offset force is applied to the carriage 11 in the same direction as its moving direction, the negative driving bias signal is added to the signal supplied to the D/A converter 45, i.e., the positive driving bias signal is subtracted.

In this manner, accurate offset amounts of VCM 12, i.e., the driving bias signal and the speed offset signal, are obtained in a short time. Also, the driving bias signal and the speed offset signal are used to provide a stable speed control of the VCM 12.

In the following, a second embodiment of the device for detecting the actuator offset amount for the optical disk device according to the present invention will be described with reference to FIG. 8

Figure 8:
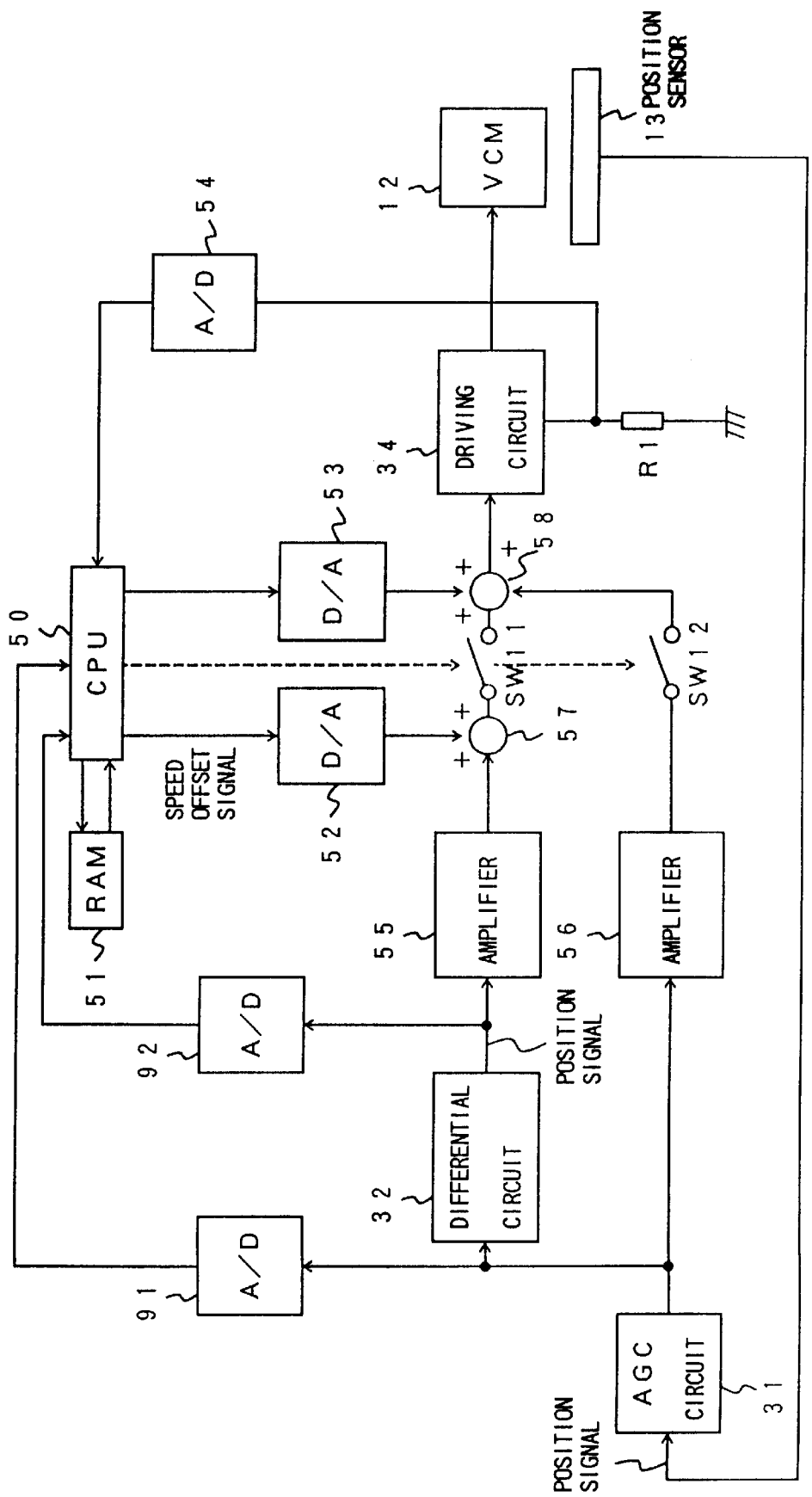
FIG. 8 is a block diagram of an example of a servo-system configuration for the VCM according to a second embodiment.

FIG. 8 shows a block diagram of an example of a servo-system configuration for the VCM 12 according to the second embodiment. In FIG. 8, the same elements as those of FIG. 5 are referred to by the same numerals, and description thereof will be omitted. In FIG. 8, a central processing unit CPU 50 is used instead of the DSP 33.

In FIG. 8, the servo system for the VCM 12 includes the AGC circuit 31, the differential circuit 32, a CPU 50, a RAM 51, D/A converters 52 and 53, A/D converters 54, 91, and 92, amplifiers 55 and 56, adders 57 and 58, switches SW11 and SW12, the driving circuit 34, a resistance R1, the carriage-position sensor 13, and the VCM 12.

During the seek operation, the CPU 50 controls the switch SW11 to be closed and the switch SW12 to be open, and moves the carriage 11 at a locked optimal speed in the same manner as described above. Thus, the speed signal obtained at the differential circuit 32 is supplied to the adder 57 via the amplifier 55. The adder 57 adds the output of the amplifier 55 to an output of the D/A converter 52, and supplies the sum of these two to the adder 58. The adder 58 adds the output of the adder 57 to an output of the D/A converter 53, and supplies the sum of these two to the driving circuit 34.

In order to adjust the offset amount of the VCM 12, the CPU 50 opens the switch SW11 and closes the switch SW12. Thus, the position signal from the AGC circuit 31 is supplied to the adder 58 via the amplifier 56 and the switch SW12. The CPU 50 locks the carriage 11 at the intermediate position after moving the carriage 11 to this position, while monitoring the position signal provided by the carriage-position sensor 13 via the AGC circuit 31 and the A/D converter 91. Also, the CPU 50 checks if the carriage 11 is staying at the intermediate position, based on the position signal provided by the carriage-position sensor 13 via the AGC circuit 31.

The CPU 50 stores the speed signal, which is provided by the differential circuit 32 via the A/D converter 92, in the RAM 51 as the speed offset signal. This is done while the carriage 11 is staying at the intermediate position. Also, the CPU 50 stores the driving signal, which is generated by the driving circuit 34, in the RAM 51 as the driving bias signal. This is done while the carriage 11 is staying at the intermediate position. In detail, a signal indicating a voltage level at a point between the A/D converter 54 and the resistance R1 is converted into a digital signal by the A/D converter 54. Then, this digital signal is stored in the RAM 51 as the driving bias signal. The driving bias signal is later read from the RAM 51, and is supplied to the adder 58 after a conversion to an analog signal at the D/A converter 53.

As described before, the speed offset signal represents an offset amount which should be added to or subtracted from the speed signal in order to adjust the actual speed of the carriage 11 to a desired moving speed, thus canceling the offset force applied to the carriage 11. The CPU 50 obtains the speed offset signal based on the speed signal from the differential circuit 32, and stores the speed offset signal in the RAM 51. The speed offset signal is later read from the RAM 51, and, then, supplied to the adder 57 after a conversion to an analog signal at the D/A converter 52.

Accordingly, when the offset force is applied to the carriage 11 in an opposite direction to its moving direction, the positive driving bias signal is added to the signal supplied to the driving circuit 34. On the other hand, when the offset force is applied to the carriage 11 in the same direction as its moving direction, the negative driving bias signal is added to the signal supplied to the driving circuit 34, i.e., the positive driving bias signal is subtracted.

In this manner, accurate offset amounts of VCM 12, i.e., the driving bias signal and the speed offset signal, are obtained in a short time. Also, the driving bias signal and the speed offset signal are used to provide a stable speed control of the VCM 12.

Although a system for processing the position offset signal is omitted in FIG. 8, it is apparent that the system for processing the position offset signal can be provided in the same manner as in FIG. 5. Also, the operation of the CPU 50 can be performed by the MPU 35.

In the following, a third embodiment of the device for detecting the actuator offset amount for the optical disk device will be described with reference to FIG. 9 to FIG. 11.

Figure 9:
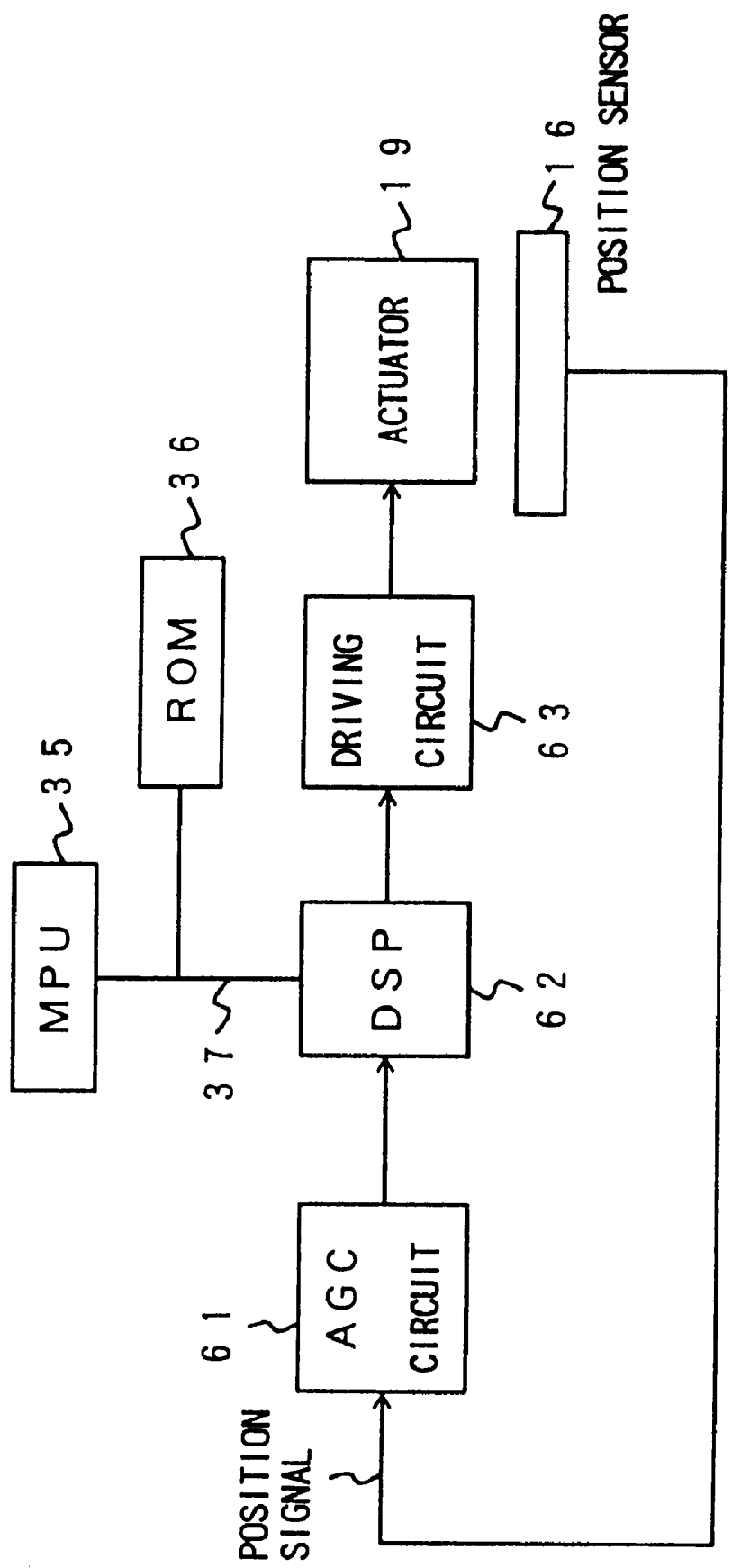
FIG. 9 is a block diagram of an example of a servo-system configuration for a lens actuator of FIG. 1 according to a third embodiment.

FIG. 9 shows a block diagram of an example of a servo-system configuration for the lens actuator 19 according to the third embodiment. In the figure, the position detection signal from the lens-position sensor 16 is supplied to an AGC circuit 61. The position signal from the AGC circuit 61 is supplied to a DSP 62. Based on the position signal, the DSP 62 generates a signal for moving the lens actuator 19 to a desired position, and supplies this signal to a driving circuit 63. The driving circuit 63 supplies a driving current to the lens actuator 19 so as to move the lens actuator 19 to the desired position.

Figure 10:
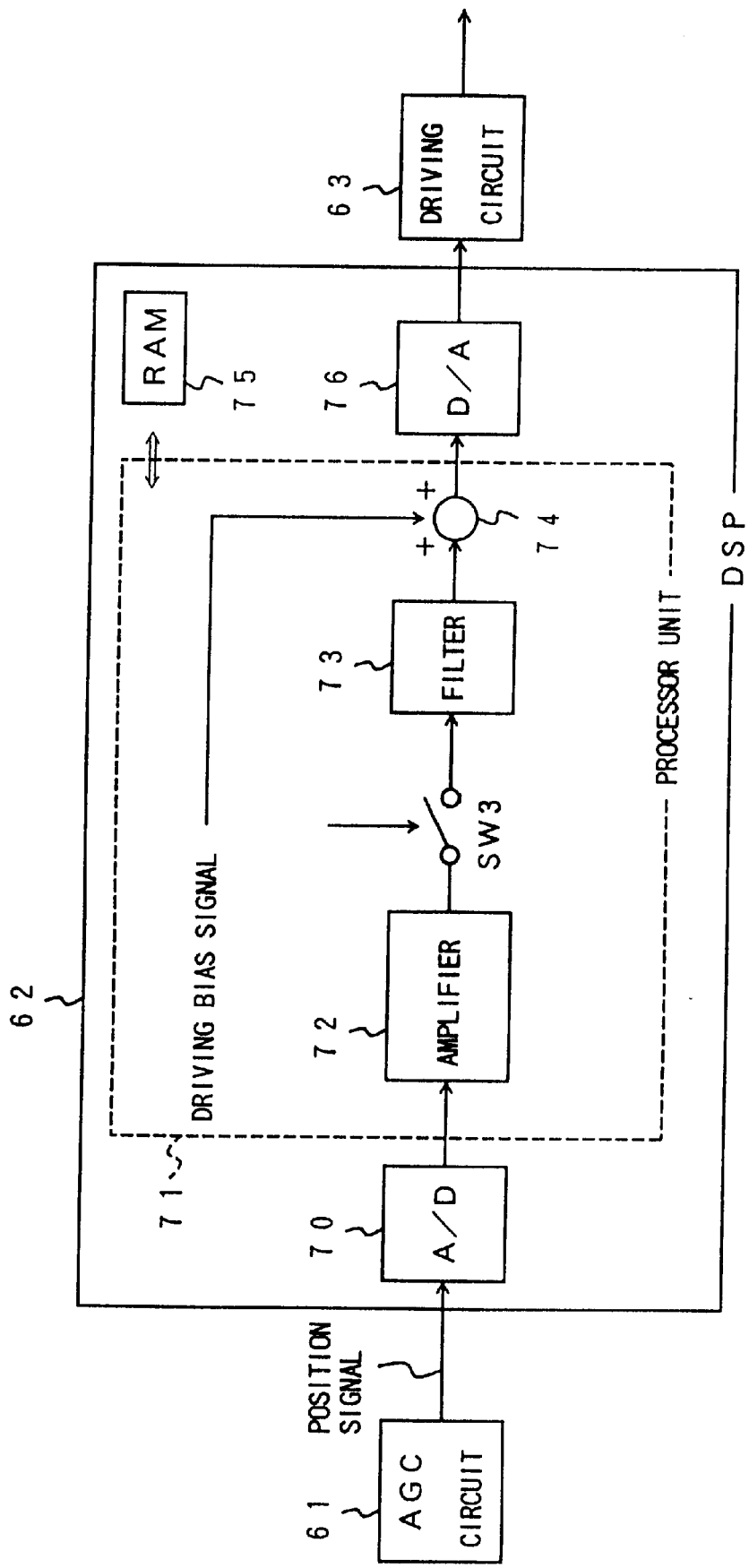
FIG. 10 is a block diagram of part of FIG. 9 showing details of a DSP of FIG. 9.

FIG. 10 shows a block diagram of part of FIG. 9. In FIG. 10, the DSP 62 includes an A/D converter 70, a processor unit 71, a RAM 75, and a D/A converter 76. The A/D converter 70 is provided with the position signal from the AGC circuit 71. The processor unit 61, based on an output of the A/D converter 70 and the driving bias signal, calculates a signal for moving the lens actuator 19 to a desired position, and then, supplies this signal to a D/A converter 76. The D/A converter 76 converts this signal into an analog signal, and supplies this analog signal to the driving circuit 63, which moves the lens actuator 19 to a desired position. The RAM 75 temporarily stores results of various intermediate calculations performed by the processor 43.

FIG. 10 also shows a block diagram whose operation is equivalent to an operation of the processor unit 71 according to the third embodiment. In the figure, the processor unit 71 includes an amplifier 72 for multiplying a coefficient, a switch SW3, a filter 73, and an adder 74. The amplifier 72 receives the signal from the A/D converter 70. An output of the amplifier 72 is supplied to the adder 74 via the switch SW3 and the filter 73. The adder 74 adds an output of the filter 73 and the driving bias signal. An output of the adder 74 is supplied to the D/A converter 76.

Figure 11:
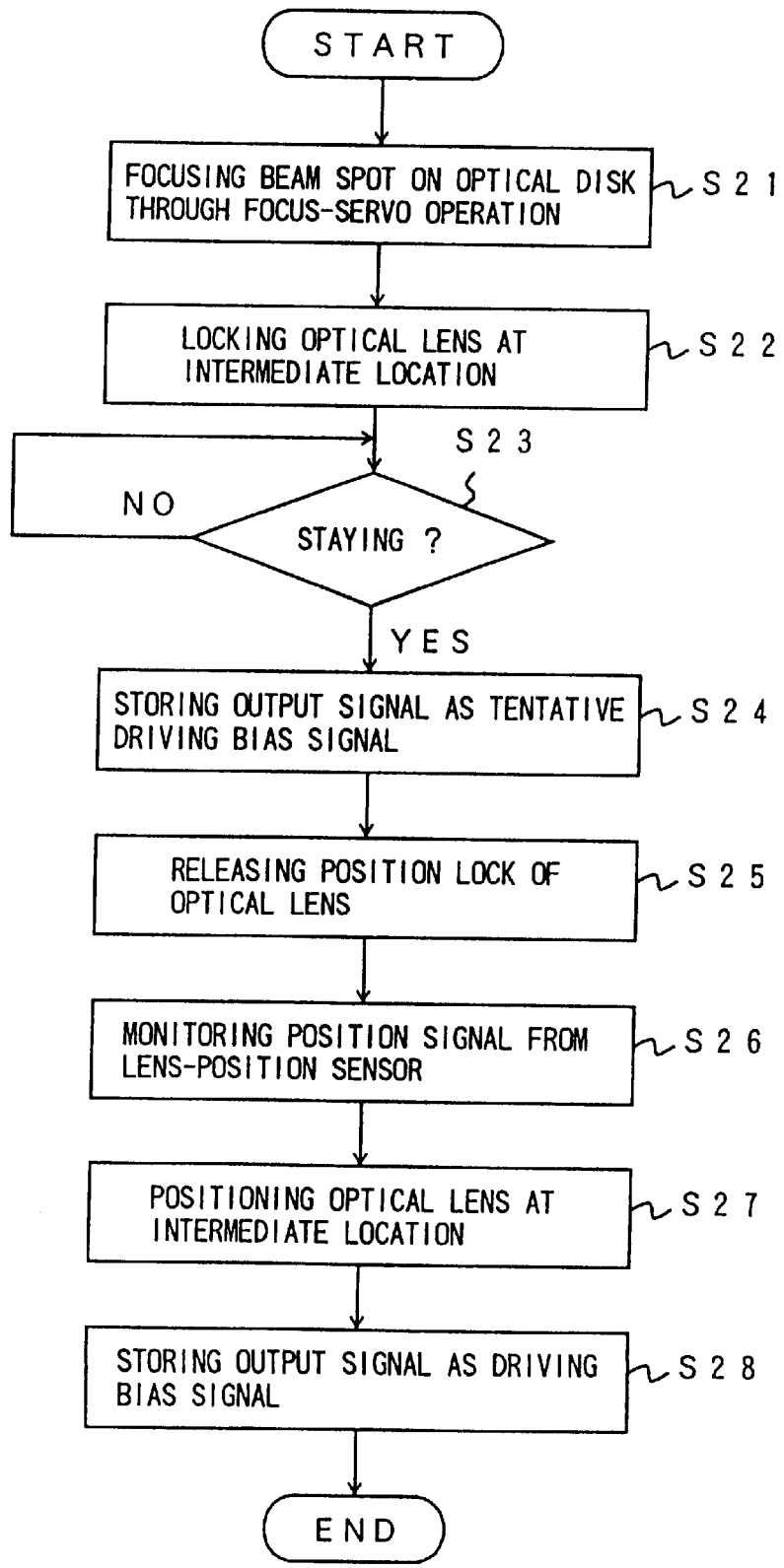
FIG. 11 is a flowchart of a process of a processor unit of the DSP of FIG. 9 when it adjusts the offset amount of the lens actuator.

FIG. 11 shows a flowchart of a process of the processor unit 71 of the DSP 62 when it adjust the offset amount of the lens actuator 19. The process of FIG. 11 corresponds to a second embodiment of the method for detecting the actuator offset amount for the optical disk device according to the present invention.

In FIG. 11, at a step S21, a focus-servo operation for the optical system 15 controls the optical lens 18 by a well known method such that the beam spot is focused on the optical disk 20. At a step S22, the optical lens 18 is locked at an intermediate location along the moving path thereof. This intermediate location is a predetermined arbitrary position on the moving path of the optical lens 18 and, for example, is stored in the ROM 36 of FIG. 4 beforehand. Here, the processor unit 71 keeps the switch SW3 closed at the step S22, and locks the optical lens 18 at the intermediate location after moving the optical lens 18 to this intermediate location. This is done while the processor unit 71 monitors the position signal provided by the lens-position sensor 16 via the AGC circuit 61.

At a step S23, a check is made based on the position signal from the lens-position sensor 16 whether the optical lens 18 is staying at the intermediate position. If an answer of the check is "YES", the procedure goes to a step S24.

At the step S24, the signal supplied to the D/A converter 76 from the adder 74 of the processor unit 71 is stored into the RAM 75 as a tentative driving bias signal. This is done while the optical lens 18 is staying at the intermediate position. In this case, the optical lens 18 is locked at the intermediate position while the focus-servo operation for the optical system 15 is activated. Thus, the processor unit 71 can obtain the output signal of the adder 74 with little friction between the lens actuator 19 and supporting members (not shown) of the optical lens 19. This means that the processor unit 71 can more accurately obtain a tentative driving bias signal.

During the seek operation, the optical lens 18 is moved by the lens actuator 19 a very short distance in a very short period of time. The traveling length of the optical lens 18 in this case is an order of ten tracks (an order of 10 micron). Thus, with regard to the lens actuator 19, the speed control cannot be performed by locking the moving speed as in the case of the VCM 12. In general, the movement of the lens actuator 19 during the seek operation is performed by applying pulses to the lens actuator 19 while a speed control loop is open.

Also, when the position of the optical lens 18 is locked, the gain of the control loop is generally set low in order to prevent a controlled variable to follow noise. As a result, small gains for lower frequencies (e.g., a direct current component) lead to errors in the lower frequencies. In order to obtain the offset amount of the lens actuator 19 as accurately as possible, it is desirable to open the switch SW3 when obtaining the driving bias signal. That is, the driving bias signal had better be obtained while unlocking the position lock of the optical lens 18.

In the third embodiment, at a step S25 of FIG. 11, the position lock of the optical lens 18 is released by opening the switch SW3. At a step S26, the position signal provided by the lens-position sensor 16 via the AGC circuit 61 is monitored while the control loop is open. At a step S27, the lens actuator 19 is controlled based on the position signal such that the optical lens 18 is positioned at the intermediate location. Namely, the position of the lens actuator 19 is fine-adjusted by monitoring the position signal such that the lens actuator 19 is moved to the intermediate position. During this fine adjustment, the tentative driving bias signal read from the RAM 75 by the processor unit 71 is supplied to the adder 74. At a step S28, the output of the adder 74 of the processor unit 71, which is supplied to the D/A converter 76, is provided to the RAM 75 as the driving bias signal while the lens actuator 19 is still at the intermediate position.

When the seek operation is conducted, the processor unit 71 reads the driving bias signal from the RAM 75, and supplies it to the adder 74.

Accordingly, when the offset force is applied to the optical lens 18 in an opposite direction to its moving direction, the positive driving bias signal is added to the signal supplied to the D/A converter 76. On the other hand, when the offset force is applied to the optical lens 18 in the same direction as its moving direction, the negative driving bias signal is added to the signal supplied to the D/A converter 76, i.e., the positive driving bias signal is subtracted.

In this manner, an accurate offset amount of the lens actuator 19, i.e., the driving bias signal, is obtained in a short time. Also, the driving bias signal is used for providing a stable control of the lens actuator 19.

In the following, a fourth embodiment of the device for detecting the actuator offset amount for the optical disk device according to the present invention will be described with reference to FIG. 12.

Figure 12:
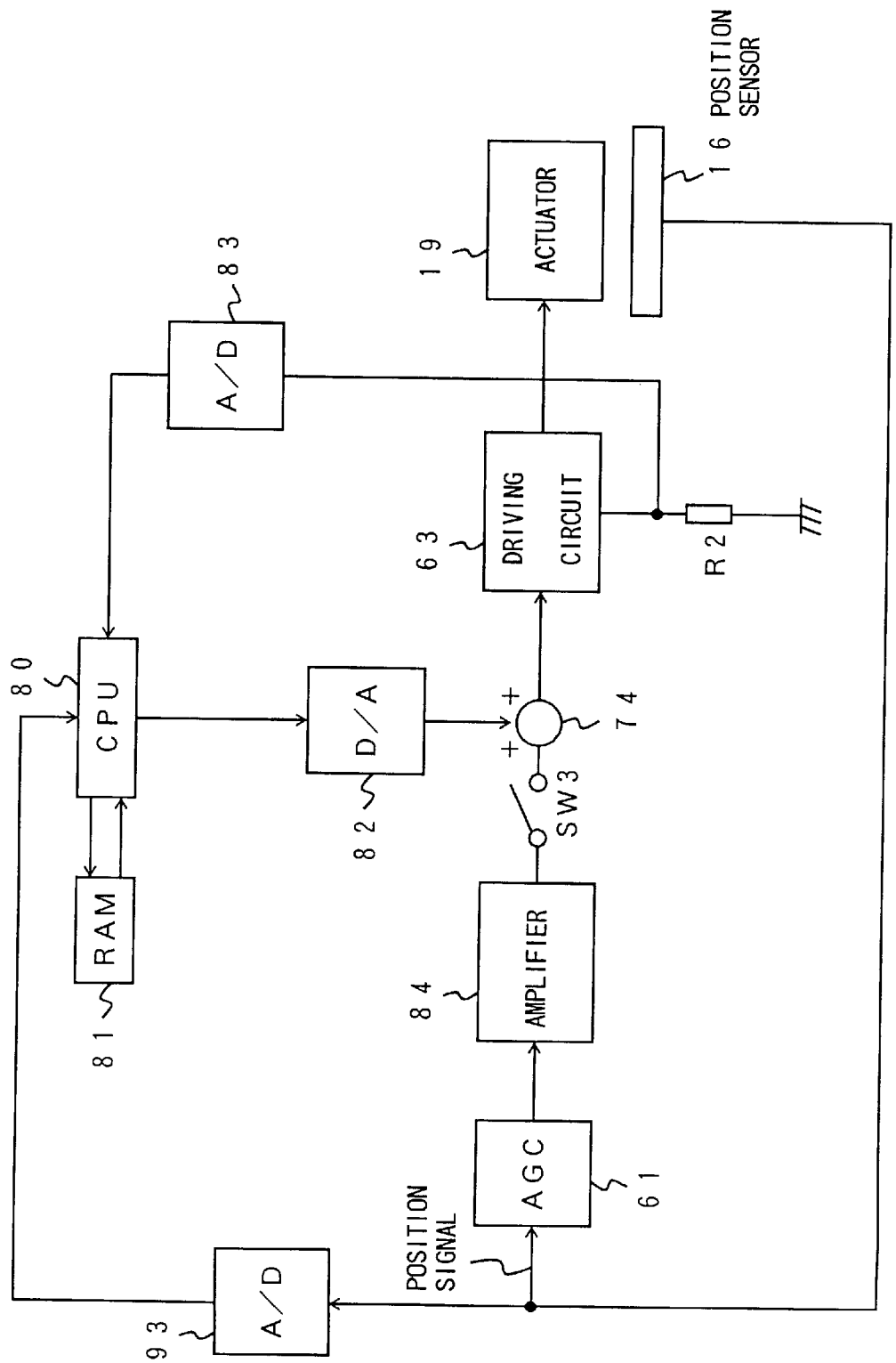
FIG. 12 is a block diagram of an example of a servo-system configuration for the lens actuator according to a fourth embodiment.

FIG. 12 shows a block diagram of an example of a servo-system configuration for the lens actuator 19 according to the fourth embodiment. In FIG. 12, the same elements as those of FIG. 10 are referred to by the same numerals, and description thereof will be omitted. In FIG. 12, a CPU 80 is used instead of the DSP 62.

In FIG. 12, the servo system of the lens actuator 19 includes the AGC circuit 61, a CPU 80, a RAM 81, a D/A converter 82, A/D converters 83 and 93, an amplifier 84, the adder 74, the switch SW3, the driving circuit 63, the resistance R2, the lens-position sensor 16, and the lens actuator 19.

During the seek operation, the CPU 80 controls the switch SW3 to the closed position, and moves the optical lens 18 in the same manner as described above without locking the moving speed of the lens actuator 19. The position signal from the AGC circuit 61 is supplied to the adder 74 via the amplifier 84 and the switch SW3. The adder 74 adds the output of the amplifier 84 to the output of the D/A converter 82, and provides the sum of these two for the driving circuit 63.

In order to adjust the offset amount of the lens actuator 19, the CPU 80 closes the switch SW3. Thus, the position signal from the AGC circuit 61 is supplied to the adder 74 via the amplifier 84 and the switch SW3. The CPU 80 locks the optical lens 18 at the intermediate position after moving the optical lens 18 to this position while monitoring the position signal provided by the lens-position sensor 16 via the A/D converter 93. Also, the CPU 80 checks if the optical lens 18 is staying at the intermediate position, based on the position signal provided by the lens-position sensor 16 via the A/D converter 93.

The CPU 80 stores the driving signal, which is generated by the driving circuit 63, in the RAM 81 as the driving bias signal, while the optical lens 18 stays at the intermediate position. In detail, a signal indicating a voltage level at a point between the driving circuit 63 and the resistance R2 is converted to a digital signal by the A/D converter 83. Then, this digital signal is stored in the RAM 81 as the driving bias signal. The driving bias signal is later read from the RAM 81, and is supplied to the adder 74 after a conversion to an analog signal at the D/A converter 82.

Accordingly, when the offset force is applied to the optical lens 18 in an opposite direction to its moving direction, the positive driving bias signal is added to the signal supplied to the D/A converter 76. On the other hand, when the offset force is applied to the optical lens 18 in the same direction as its moving direction, the negative driving bias signal is added to the signal supplied to the D/A converter 76, i.e., the positive driving bias signal is subtracted.

In this manner, an accurate offset amount of lens actuator 19, i.e., the driving bias signal, is obtained in a short time. Also, the driving bias signal is used to provide a stable control of the lens actuator 19. Here, the operation of the CPU 80 can be performed by the MPU 35.

The third embodiment and the fourth embodiment can be combined with the first embodiment and the second embodiment. That is, in order to perform both the coarse adjustment and the fine adjustment of the beam spot (with regard to the tracks), for example, the first embodiment and the third embodiment can be used together.

As described above, according to the present invention, the actuator offset amount is obtained accurately in a short time.

Also, according to the present invention, the coarse adjustment of the position of the light beam spot on the optical disk is performed in a stable manner.

Also, according to the present invention, the fine adjustment of the position of the light beam spot on the optical disk is performed in a stable manner.

Also, according to the present invention, the seek operation is conducted at high precision.

Also, according to the present invention, the carriage is kept in the proximity of the equilibrium point of the optical disk device, so as to provide easy detection of the offset amount.

Also, according to the present invention, an accurate offset amount of the actuator is obtained in a short time with a simple configuration.

Also, according to the present invention, the focus servo operation is activated when the offset amount is detected, so that friction of the actuator is canceled. Thus, an accurate offset amount is obtained to perform a stable fine adjustment of the light beam spot on the optical disk.

Also, according to the present invention, the system has a low DC gain to take advantage of the accurate offset amount, so that the fine adjustment of the light beam spot on the optical disk is performed in a stable manner.

Also, according to the present invention, the accurate offset amount is obtained in a short time with a simple configuration, in which there is no chance to damage the actuator or the driving circuit by accidentally applying an excessive electric current to the actuator.

Further, the present invention is not limited to these embodiments, but various variations and modifications may be made without departing from the scope of the present invention.

What is claimed is:

1. A method of detecting an actuator offset amount for an optical disk device which reproduces signals by forming a spot of a light beam from an optical system on an optical disk, and includes a carriage actuator for moving said optical system to move said spot in a radial direction of said optical disk, said carriage actuator being subjected to an undesirable offset force caused by gravitational forces or forces created by a flexible printed circuit sheet applied in said radial direction, said method comprising the steps of:

a) controlling a driving signal supplied to said carriage actuator so as to keep said spot at a predetermined position on a moving path of said spot despite presence of said undesirable offset force; and b) detecting said driving signal supplied to said carriage actuator while keeping said spot at said predetermined position, and storing said driving signal as said actuator offset amount, so that said driving signal is subsequently used for canceling said undesirable offset force.

2. The method as claimed in claim 1, further comprising a step of determining, based on said actuator offset amount, a magnitude of said driving signal which is supplied to said carriage actuator in order to move said spot to a desired track on said optical disk during a seek operation.

3. The method as claimed in claim 1, wherein said predetermined position is a general center of said moving path of said spot.

4. A method of detecting an actuator offset amount for an optical disk device which reproduces signals by forming a spot of a light beam from an optical system on an optical disk, and includes an actuator for moving said spot in a radial direction of said optical disk, said actuator being subjected to an undesirable offset force applied in said radial direction, said method comprising the steps of:

a) controlling a driving signal supplied to said actuator so as to keep said spot at a predetermined position on a moving path of said spot despite presence of said undesirable offset force;

b1) detecting said driving signal supplied to said actuator which keeps said spot at said predetermined position, and storing said driving signal as a tentative offset amount;

b2) controlling said driving signal by using said tentative offset amount so as to keep said spot at said predetermined position in the absence of use of a feedback loop;

b3) detecting and storing as said actuator offset amount said driving signal which keeps said spot at said predetermined position in the absence of said use of said feedback loop; and c) finely adjusting a position of said spot on said optical disk using said actuator for moving an optical lens located interiorly of said optical system.

5. The method as claimed in claim 4, further comprising a step of determining, based on said actuator offset amount, a magnitude of said driving signal which is supplied to said actuator in order to move said spot to a desired track on said optical disk during a seek operation.

6. A method of detecting actuator offset amounts for an optical disk device which reproduces signals by forming a spot of a light beam from an optical system on an optical disk, said actuator offset amounts being used for canceling an undesirable offset force applied to an actuator in a moving direction of said actuator, said actuator including a first actuator and a second actuator, said method comprising the steps of:

a) controlling a first driving signal supplied to said first actuator so as to keep said spot at a first predetermined position on a moving path of said spot despite presence of said undesirable offset force, wherein said first actuator moves said optical system so as to perform a coarse adjustment of a position of said spot with regard to tracks on said optical disk;

b) detecting said first driving signal keeping said spot at said first predetermined position, and storing said first driving signal as a first one of said actuator offset amounts and c) controlling a second driving signal supplied to said second actuator so as to keep said spot at a second predetermined position on a moving path of said spot despite presence of said undesirable offset force, wherein said second actuator moves an optical lens inside said optical system so as to perform a fine adjustment of a position of said spot with regard to tracks on said optical disk, said controlling of said second driving signal further including the steps of: (c)(1) detecting said second driving signal as a position, and storing said second driving signal as a tentative offset amount; (c)(2) controlling said second driving signal by using said tentative offset amount so as to keep said spot at said second predetermined position in the absence of use of a feedback loop; and (c)(3) detecting and storing said second driving signal as a second one of said actuator offset amounts, which keeps said spot at said second predetermined position in the absence of said use of said feedback loop.

7. The method as claimed in claim 6, wherein step c) further comprises controlling said second driving signal while keeping said spot focused on said optical disk by activating a focus servo operation.

8. The method as claimed in claim 7, further comprising the steps of:

d) determining, based on said first one of said actuator offset amounts, a magnitude of said first driving signal which is supplied to said first actuator during a seek operation; and e) determining, based on said second one of said actuator offset amounts, a magnitude of said second driving signal which is supplied to said second actuator during said seek operation, wherein said first actuator and said second actuator can move said spot to a desired track on said optical disk during said seek operation.

9. The method as claimed in claim 6, further comprising the steps of:

d) determining, based on said first one of said actuator offset amounts, a magnitude of said first driving signal which is supplied to said first actuator during a seek operation; and e) determining, based on said second one of said actuator offset amounts, a magnitude of said second driving signal which is supplied to said second actuator during said seek operation, wherein said first actuator and said second actuator can move said spot to a desired track on said optical disk during said seek operation.

10. A device for detecting an actuator offset amount for an optical disk drive which reproduces signals by forming a spot of a light beam from an optical system on an optical disk, and includes a carriage actuator for moving said optical system to move said spot in a radial direction of said optical disk, said actuator being subjected to an undesirable offset force caused by gravitational forces or forces created by a flexible printed circuit sheet applied in said radial direction, said device comprising:

first means for controlling a driving signal supplied to said carriage actuator so as to keep said spot at a predetermined position on a moving path of said spot despite presence of said undesirable offset force; and second means for detecting said driving signal supplied to said carriage actuator while keeping said spot at said predetermined position, and storing said driving signal as said actuator offset amount, so that said driving signal is subsequently used for canceling said undesirable offset force.

11. The device as claimed in claim 10, further comprising third means for determining, based on said actuator offset amount, a magnitude of said driving signal which is supplied to said carriage actuator in order to move said spot to a desired track on said optical disk during a seek operation.

12. The device as claimed in claim 10, wherein said first means controls said driving signal while a focus servo operation for said optical system is activated to keep said spot focused on said optical disk.

13. The device as claimed in claim 12, further comprising third means for determining, based on said actuator offset amount, a magnitude of said driving signal which is supplied to said actuator in order to move said spot to a desired track on said optical disk during a seek operation.

14. The device as claimed in claim 10, wherein said predetermined position is substantially midpoint of said moving path of said spot.

15. A device for detecting an actuator offset amount for an optical disk drive which reproduces signals by forming a spot of a light beam from an optical system on an optical disk, and includes an actuator for moving said spot in a radial direction of said optical disk, said actuator being subjected to an undesirable offset force applied in said radial direction, said device comprising:

first means for controlling a driving signal supplied to said actuator so as to keep said spot at a predetermined position on a moving path of said spot despite presence of said undesirable offset force;

means for detecting said driving signal supplied to said actuator which keeps said spot at said predetermined position, and storing said driving signal as a tentative offset amount;

second means for controlling said driving signal by using said tentative offset amount so as to keep said spot at said predetermined position in the absence of use of a feedback loop; and means for detecting and storing as said actuator offset amount said driving signal which keeps said spot at said predetermined position in the absence of said use of said feedback loop; and said actuator further providing a fine adjustment of a position of said spot on said optical disk by moving an optical lens positioned inside said optical system.

16. The device as claimed in claim 15, further comprising third means for determining, based on said actuator offset amount, a magnitude of said driving signal which is supplied to said actuator in order to move said spot to a desired track on said optical disk during a seek operation.

17. A device for detecting actuator offset amounts of an optical disk device which reproduces signals by forming a spot of a light beam from an optical system on an optical disk, said actuator offset amounts being used for canceling an undesirable offset force applied to an actuator in a moving direction of said actuator, said actuator including a first actuator and a second actuator, said device comprising:

first means for controlling a first driving signal supplied to said first actuator so as to keep said spot at a first predetermined position on a moving path of said spot despite presence of said undesirable offset force, wherein said first actuator moves said optical system to perform a coarse adjustment of a position of said spot with regard to tracks on said optical disk;

second means for detecting said first driving signal, which keeps said spot at said first predetermined position, and storing said first driving signal as a first one of said actuator offset amounts;

third means for controlling a second driving signal supplied to said second actuator so as to keep said spot at a second predetermined position on a moving path of said spot despite presence of said undesirable offset force, wherein said second actuator moves an optical lens positioned inside said optical system to perform a fine adjustment of a position of said spot with regard to tracks on said optical disk; and fourth means for detecting said second driving signal, which keeps said spot at said second predetermined position in the absence of use of a feedback loop, and storing said second driving signal as a second one of said actuator offset amounts, said fourth means including means for detecting said second driving signal and storing said second driving signal as a tentative offset amount; and means for controlling said second driving signal by using said tentative offset amount so as to keep said spot at said second predetermined position in the absence of said use of said feedback loop.

18. The device as claimed in claim 17, wherein said third means controls said second driving signal while a focus servo operation for said optical system is activated so as to keep said spot focused on said optical disk.

19. The device as claimed in claim 18, further comprising:

fifth means for determining, based on said first one of said actuator offset amounts, a magnitude of said first driving signal which is supplied to said first actuator during a seek operation; and sixth means for determining, based on said second one of said actuator offset amounts, a magnitude of said second driving signal which is supplied to said second actuator during said seek operation, wherein said first actuator and said second actuator can move said spot to a desired track on said optical disk during said seek operation.

20. The device as claimed in claim 17, further comprising:

fifth means for determining, based on said first one of said actuator offset amounts, a magnitude of said first driving signal which is supplied to said first actuator during a seek operation; and sixth means for determining, based on said second one of said actuator offset amounts, a magnitude of said second driving signal which is supplied to said second actuator during said seek operation, wherein said first actuator and said second actuator can move said spot to a desired track on said optical disk during said seek operation.

21. A method of detecting an actuator offset amount for an optical disk device which reproduces signals by forming a spot of a light beam from an optical system on an optical disk, and includes an actuator for moving said spot in a radial direction of said optical disk, said actuator being subjected to undesirable offset force caused by gravitational forces or forces created by a flexible printed circuit sheet applied in said radial direction, said method comprising the steps of:

detecting the position of a lens; and using a drive signal to move said lens from the detected position to a target track, said drive signal being adjusted to compensate for offset using predetermined offset values stored in memory, said offset values being detected from a driving signal supplied to said actuator while keeping said spot at a predetermined position.

22. The method of claim 21 wherein the driving signal includes a speed offset and a driving bias for a lens carriage.

23. The method of claim 21 wherein the driving signal includes a speed offset and a driving bias for said actuator.

* * * * *